United States Patent
Tawara

(10) Patent No.: US 10,169,916 B2
(45) Date of Patent: Jan. 1, 2019

(54) IMAGE PROCESSING DEVICE AND IMAGE PROCESSING METHOD

(71) Applicant: SONY CORPORATION, Tokyo (JP)

(72) Inventor: Tetsuo Tawara, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/893,036

(22) PCT Filed: Apr. 4, 2014

(86) PCT No.: PCT/JP2014/060021
§ 371 (c)(1),
(2) Date: Nov. 20, 2015

(87) PCT Pub. No.: WO2014/192418
PCT Pub. Date: Dec. 4, 2014

(65) Prior Publication Data
US 2016/0093109 A1    Mar. 31, 2016

(30) Foreign Application Priority Data

May 27, 2013  (JP) .................... 2013-111030

(51) Int. Cl.
G06T 19/00   (2011.01)
G06T 5/10    (2006.01)
G06T 7/00    (2017.01)
G06T 7/73    (2017.01)

(52) U.S. Cl.
CPC .............. *G06T 19/006* (2013.01); *G06T 5/10* (2013.01); *G06T 7/73* (2017.01); *G06T 2207/30201* (2013.01)

(58) Field of Classification Search
CPC ........ G06T 19/006; G06T 19/00; G06T 19/20
See application file for complete search history.

(56) References Cited

U.S. PATENT DOCUMENTS

| | | | | |
|---|---|---|---|---|
| 2002/0052709 | A1* | 5/2002 | Akatsuka | G01B 11/24 702/153 |
| 2005/0234333 | A1* | 10/2005 | Takemoto | G02B 27/017 600/426 |
| 2010/0185529 | A1* | 7/2010 | Chesnut | G06Q 30/00 705/26.1 |
| 2015/0070389 | A1* | 3/2015 | Goto | G06T 7/00 345/633 |

FOREIGN PATENT DOCUMENTS

JP    2012-221250 A    11/2012
JP    2013-59542 A     4/2013

* cited by examiner

*Primary Examiner* — Yingchun He
(74) *Attorney, Agent, or Firm* — Chip Law Group

(57) ABSTRACT

There is provided an image processing device including: a setting unit configured to set a filter intensity based on a degree of how exactly an imaging device that produces a captured image containing a marker related to display of a virtual object faces the marker, the degree being detected based on the captured image; and an image processing unit configured to combine the virtual object corresponding to the marker with the captured image by using a filter having the set filter intensity.

12 Claims, 7 Drawing Sheets

FIG. 3
| A | B | |
|---|---|---|
| square marker | rectangular marker | · · · |
| · equal side lengths<br>· front normal vector<br>· corner angle | · front normal vector<br>· corner angle | · · · } at least one |
| · centered-ness<br>· normal vector speed<br>· marker mean center speed | · centered-ness<br>· normal vector speed<br>· marker mean center speed | · · · } optional |
FIG. 4
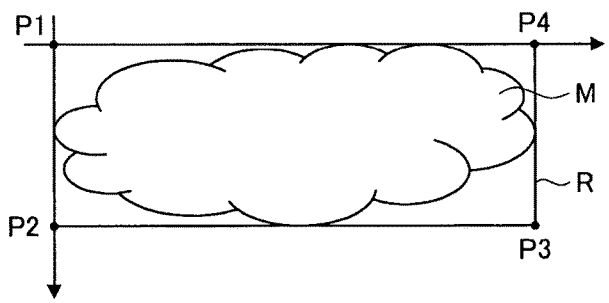
FIG. 5
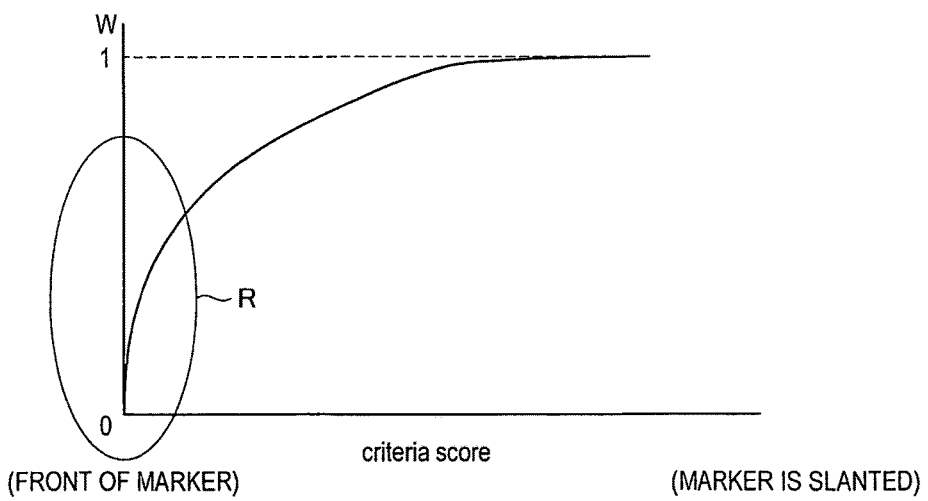

IMAGE PROCESSING DEVICE AND IMAGE PROCESSING METHOD

TECHNICAL FIELD

The present disclosure relates to image processing devices, image processing methods, and programs.

BACKGROUND ART

A technology called augmented reality (hereinafter referred to as "AR") has in recent years attracted attention, which, for example, combines a virtual object, such as an image, characters, or the like, (hereinafter referred to as a "virtual object") with an image showing a real object, and displays the image combined with the virtual object on a display screen. A device that uses the AR technology to combine a virtual object with an image detects a marker related to display of a virtual object, that is contained in an image captured by, for example, an imaging device (hereinafter referred to as a "captured image"), and combines a virtual object corresponding to the detected marker with the captured image. Therefore, the use of the AR technology allows for display of an image in which a virtual object is superimposed on an image showing a real object, on a display screen.

Under such circumstances, techniques involved in combining a virtual object in AR have been developed. Among the techniques involved in combining a virtual object in AR is, for example, one that is described in Patent Literature 1 below.

CITATION LIST

Patent Literature

Patent Literature 1: JP 2012-221250A

SUMMARY OF INVENTION

Technical Problem

During detection of a marker in a captured image, as an imaging device that produces the captured image faces more exactly the marker whose image is captured, a change in the view becomes smaller with respect to the inclination of the shooting direction of the imaging device with respect to the marker. Therefore, as the imaging device faces more exactly the marker, the relative orientation of the marker detected in the captured image is more significantly affected by external disturbance. Therefore, when an image obtained by combining the virtual object with the captured image is displayed on a display screen, the display of the virtual object may be disturbed, such as that the displayed virtual object corresponding to the detected marker is blurred, and the like.

Here, for example, in the technique described in Patent Literature 1, the display of a virtual object is changed according to the stability of recognition of a marker recognized from a captured image. Therefore, for example, when the technique described in Patent Literature 1 is used, the disturbance of display of a virtual object may be prevented to some extent. However, for example, in the technique described in Patent Literature 1, the disturbance of display of a virtual object due to the imaging device facing at a marker is not particularly taken into consideration. Therefore, for example, even when the technique described in Patent Literature 1 is used, it is not always possible to prevent the disturbance of display of a virtual object due to the imaging device facing exactly a marker, which may occur when an image obtained by combining a virtual object with a captured image is displayed on a display screen.

The present disclosure proposes a novel and improved image processing device, image processing method, and program that can prevent the disturbance of display of a virtual object.

Solution to Problem

According to the present disclosure, there is provided an image processing device including: a setting unit configured to set a filter intensity based on a degree of how exactly an imaging device that produces a captured image containing a marker related to display of a virtual object faces the marker, the degree being detected based on the captured image; and an image processing unit configured to combine the virtual object corresponding to the marker with the captured image by using a filter having the set filter intensity.

According to the present disclosure, there is provided an image processing method including: a step of setting a filter intensity based on a degree of how exactly an imaging device that produces a captured image containing a marker related to display of a virtual object faces the marker, the degree being detected based on the captured image; and a step of combining the virtual object corresponding to the marker with the captured image by using a filter having the set filter intensity.

According to the present disclosure, there is provided a program for causing a computer to execute: a step of setting a filter intensity based on a degree of how exactly an imaging device that produces a captured image containing a marker related to display of a virtual object faces the marker, the degree being detected based on the captured image; and a step of combining the virtual object corresponding to the marker with the captured image by using a filter having the set filter intensity.

Advantageous Effects of Invention

According to the present disclosure, the disturbance of display of a virtual object can be prevented.

BRIEF DESCRIPTION OF DRAWINGS

FIG. 3 is an explanatory diagram showing example criteria according to this embodiment corresponding to a marker shape.

FIG. 4 is an explanatory diagram for describing an example process involved in an image processing method according to this embodiment.

FIG. 5 is an explanatory diagram showing an example relationship between a criteria score and a filter coefficient (a value determining a filter intensity) that is indicated by filter intensity setting information according to this embodiment.

DESCRIPTION OF EMBODIMENTS

Hereinafter, (a) preferred embodiment(s) of the present disclosure will be described in detail with reference to the appended drawings. Note that, in this specification and the drawings, elements that have substantially the same function and structure are denoted with the same reference signs, and repeated explanation is omitted.

Also, description that follows will be provided in the following order.

1. Image processing method according to this embodiment
2. Image processing device according to this embodiment
3. Program according to this embodiment (Image Processing Method According to this Embodiment)

Prior to describing a configuration of an image processing device according to this embodiment, an image processing method according to this embodiment will be firstly described. In the description that follows, the image processing method according to this embodiment will be described by illustrating an example case where the image processing device according to this embodiment performs a process involved in the image processing method according to this embodiment.

[1] Basic Process Involved in Combining Virtual Object Based on Captured Image, and Problem that may Occur when the Basic Process is Performed Prior to outlining the image processing method according to this embodiment, an example basic process involved in combining a virtual object based on a captured image, and an example problem that may occur when the basic process is performed, will be described. The captured image according to this embodiment is, for example, a moving image (still images corresponding to a plurality of respective frames).

Figure 1:
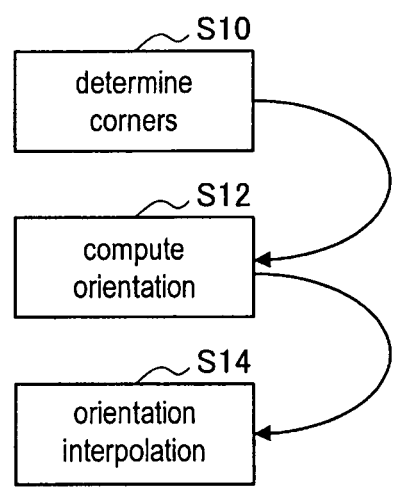
FIG. 1 is an explanatory diagram showing an example basic process involved in combining a virtual object.

FIG. 1 is an explanatory diagram showing an example basic process involved in combining a virtual object. In the description that follows, it is assumed that the process shown in FIG. 1 is performed by a device that processes a captured image (hereinafter referred to as an "image processing device").

To combine a virtual object based on a captured image, the image processing device detects locations of corners of a marker in the captured image (S10). The image processing device detects a marker in a captured image by, for example, referencing model data indicating a marker that is stored in a recording medium. Thereafter, the image processing device specifies, for example, coordinates (two-dimensional coordinates) of locations of corners (e.g., locations of four corners, or the like) of the detected marker in the captured image. The coordinates in the captured image are represented by, for example, a coordinate system whose origin is any point (e.g., a lower left corner point, center point, or the like) in the captured image.

If the locations of corners of the marker have been detected in step S10, the image processing device detects a relative location relationship between the imaging device and the marker (S12). Here, the relative location relationship between the imaging device and the marker is represented by, for example, three-dimensional coordinates.

If, in step S12, relative locations of the imaging device and the marker have been detected, the image processing device combines a virtual object corresponding to the marker with the captured image based on three-dimensional coordinates indicating the relative locations (S14). Here, in step S14, for example, the image processing device may perform an interpolation process of interpolating between an image in the previous frame and an image in the current frame.

For example, the process shown in FIG. 1 is performed so that the virtual object corresponding to the marker is combined with the captured image.

However, as described above, during detection of a marker in a captured image, as an imaging device faces more exactly the marker whose image is captured, a change in the view becomes smaller with respect to the inclination of the shooting direction of the imaging device with respect to the marker. Therefore, as the imaging device faces more exactly the marker, the relative orientation of the marker detected in the captured image is more significantly affected by external disturbance. Therefore, when an image obtained by combining a virtual object with a captured image is displayed on a display screen, the display of the virtual object may be disturbed, such as that a displayed virtual object corresponding to a detected marker is blurred, and the like.

Figure 2:
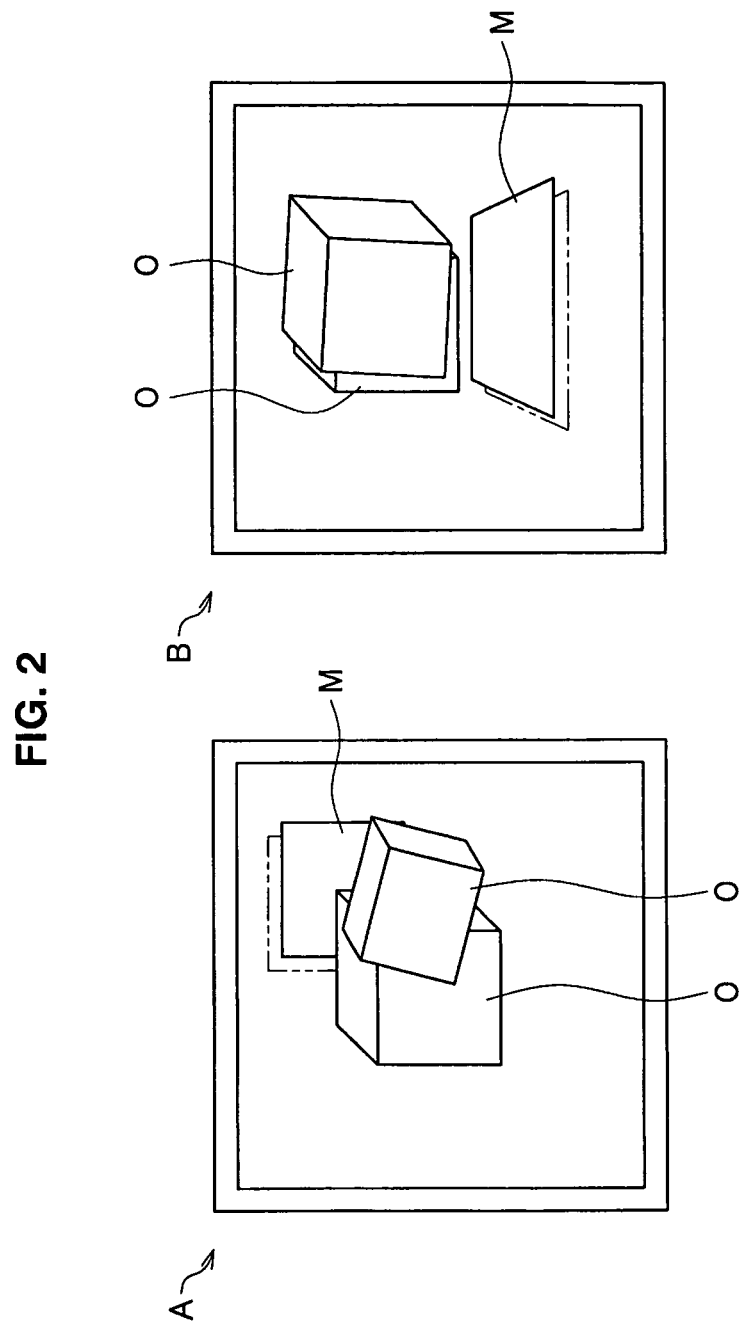
FIG. 2 is an explanatory diagram showing an example blur of a virtual object that depends on a relative location relationship between an imaging device and a marker.

FIG. 2 is an explanatory diagram showing an example blur of a virtual object that depends on a relative location relationship between an imaging device and a marker. "A" shown in FIG. 2 indicates an example blur of a virtual object when an imaging device faces exactly a marker. Also, "B" shown in FIG. 2 indicates an example blur of a virtual object when an imaging device faces less exactly a marker than in "A" of FIG. 2. "M" shown in FIG. 2 indicates an example marker. "O" shown in FIG. 2 indicates an example virtual object.

For example, as shown in FIG. 2, as an imaging device faces more exactly a marker, a blur of a virtual object increases. Also, for example, the blur shown in FIG. 2 may be recognized by the user as being larger when a virtual object that has a larger size than that of the marker contained in the captured image is combined with the captured image.

Therefore, even if a basic process involved in combining a virtual object, such as that which is shown in FIG. 1, is performed, the disturbance of display of a virtual object cannot be expected to be prevented.

[2] Process Involved in Image Processing Method According to this Embodiment

Therefore, the image processing device according to this embodiment combines a virtual object corresponding to a marker related to display of the virtual object with a captured image containing the marker based on how exactly an imaging device that produces the captured image faces the marker whose image is captured.

Here, examples of the marker according to this embodiment include a two-dimensional code, such as a matrix-type two-dimensional code or the like, a three-dimensional code, a graphical object having a predetermined pattern, such as a black-and-white graphical object or the like, and the like.

The marker according to this embodiment may be a stereoscopic marker having a flat shape or the like.

More specifically, the image processing device according to this embodiment performs, for example, (1) a setting process and (2) an image process described below to combine a virtual object corresponding to a marker with a captured image based on how exactly an imaging device that produces the captured image faces the marker.

(1) Setting Process

The image processing device according to this embodiment sets a filter intensity based on, for example, how exactly an imaging device that produces a captured image containing a marker faces the marker, which is detected based on the captured image.

Here, how exactly the imaging device according to this embodiment that produces a captured image faces a marker (hereinafter referred to as the "degree according to this embodiment") is a measure of the relative location relationship between the imaging device and the marker. The degree according to this embodiment is represented by, for example, a criteria score that is computed based on coordinates of corners corresponding to a marker detected in a captured image and criteria corresponding to a shape of the marker.

An example process involved in setting the criteria according to this embodiment, an example process involved in computing the criteria score according to this embodiment, and an example process involved in setting a filter intensity set based on the criteria score, will now be described.

(1-1) Process Involved in Setting Criteria According to this Embodiment

Firstly, an example process involved in setting the criteria according to this embodiment will be described. The criteria according to this embodiment (hereinafter also referred to as the "criteria") is set, corresponding to a marker shape indicated by the coordinates of corners of a marker specified based on a captured image.

FIG. 3 is an explanatory diagram showing an example of the criteria according to this embodiment corresponding to a marker shape. In FIG. 3, as the criteria according to this embodiment, shown are example criteria corresponding to a square marker ("A" shown in FIG. 3), and example criteria corresponding to a rectangular marker ("B" shown in FIG. 3). FIG. 3 also shows an example in which at least one criteria ("at least one" shown in FIG. 3) and an optionally set criteria ("optional" shown in FIG. 3) are contained in criteria corresponding to each marker shape.

The image processing device according to this embodiment specifies the shape of a marker detected in a captured image, based on the coordinates of corners corresponding to the marker. For example, the image processing device according to this embodiment specifies the marker shape based on the number of the coordinates of the corners and a location relationship between the coordinates of the corners. Thereafter, the image processing device according to this embodiment sets criteria corresponding to the marker shape by referencing data in which criteria, such as those shown in FIG. 3, are set, the data being stored in a recording medium, such as a storage unit (described below) or the like.

Note that the marker shape set in the data in which the criteria according to this embodiment are set is not limited to a square or rectangle shown in FIG. 3. For example, in the data in which the criteria according to this embodiment are set, criteria corresponding to various marker shapes, such as criteria corresponding to a triangular shape, criteria corresponding to a pentagonal shape, and the like, may be set.

Also, the marker according to this embodiment is not limited to markers having corners whose coordinates can be specified in a captured image, such as a square marker, rectangular marker, and the like. For example, the marker according to this embodiment may be a marker having any shape including shapes having corners whose coordinates cannot be specified in a captured image.

For example, when the coordinates of corners of a marker cannot be specified in a captured image, or when the coordinates of corners of a marker are not directly specified in a captured image, the image processing device according to this embodiment sets, for example, a rectangular region containing the marker in the captured image. Also, the image processing device according to this embodiment specifies the coordinates of four corners of the set region as the coordinates of corners corresponding to the marker.

FIG. 4 is an explanatory diagram for describing an example process involved in the image processing method according to this embodiment, showing an example process involved in specifying the coordinates of corners corresponding to a marker. "M" shown in FIG. 4 indicates, as an example marker, a marker having a shape having corners whose coordinates cannot be specified in a captured image. Also, "R" shown in FIG. 4 indicates an example rectangular region containing the marker. Also, "P1," "P2," "P3," and "P4" shown in FIG. 4 indicate the coordinates of four corners of the set region R.

For example, when a rectangular region containing a marker, such as the region R shown in FIG. 4, is set, the coordinates of four corners can be specified for a marker having any shape including shapes having marker corners whose coordinates cannot be directly specified in a captured image. Also, the image processing device according to this embodiment assumes that the coordinates of four corners of the set region are the coordinates of corners corresponding to a marker. The coordinates of four corners of the set region are represented by, for example, a coordinate system whose origin is any point (e.g., a lower left corner point, center point, or the like) in a captured image, as with coordinates in a captured image.

Therefore, the image processing device according to this embodiment can set criteria corresponding to a marker having any shape including shapes for which the coordinates of corners of a marker cannot be directly specified in a captured image, by referencing criteria corresponding to a square marker or criteria corresponding to a rectangular marker in data in which the criteria according to this embodiment, such as those shown in FIG. 3, are set.

(1-2) Process Involved in Computing Criteria Score According to this Embodiment

Next, an example process involved in computing the criteria score according to this embodiment will be described.

The image processing device according to this embodiment computes the criteria score according to this embodiment based on, for example, the coordinates of corners specified based on a captured image and criteria corresponding to the shape of a marker. Here, the criteria score computed by the image processing device according to this embodiment is, for example, a score that becomes closer to zero as the degree of how exactly an imaging device produces a captured image faces a marker increases, i.e., as the imaging device faces more exactly the marker.

The process involved in computing the criteria score will now be more specifically described, showing an example case where a marker has a rectangular shape. The image processing device according to this embodiment computes a criteria score (hereinafter also referred to as a "score") by, for example, performing computation involved in a first to a third example of the process involved in computing the criteria score described below.

Here, as described above with reference to FIG. 4, the image processing device according to this embodiment can set a rectangular region containing a marker to specify the coordinates of four corners. Therefore, even for a marker having any shape including shapes having corners whose coordinates cannot be specified in a captured image, the image processing device according to this embodiment can compute a criteria score by, for example, performing computation involved in the first to third examples of the process involved in computing the criteria score described below.

Note that, needless to say, the process involved in computing the criteria score according to this embodiment is not limited to an example in which performed is computation involved in the first to third examples of the process involved in computing the criteria score described below.

(1-2-1) First Example of Process Involved in Computing Criteria Score: Where Criteria are "Equal Side Lengths Condition"

The image processing device according to this embodiment computes a criteria score by, for example, performing computation represented by Formula 1 below. Here, "lengthX (X=1, 2, 3, 4)" shown in in Formula 1 is represented by, for example, Formula 2 based on the coordinates of corners of a marker. Also, "avl" shown in Formula 1 is represented by, for example, Formula 3.

$$\text{score}=\max(|\text{length1}-\text{avl}|, |\text{length2}-\text{avl}|, |\text{length3}-\text{avl}|, |\text{length4}-\text{avl}|)/\text{avl} \quad \text{(Formula 1)}$$

$$\text{lengthX}=\text{length of rectangle side} \quad \text{(Formula 2)}$$

$$\text{avl}=(\text{length1}+\text{length2}+\text{length3}+\text{length4})/4 \quad \text{(Formula 3)}$$

(1-2-2) Second Example of Process Involved in Computing Criteria Score: Where Criteria are "Corner Angle Condition"

The image processing device according to this embodiment computes a criteria score by, for example, performing computation represented by Formula 4 below. Here, "angleX (X=1, 2, 3, 4)" shown in Formula 4 is represented by, for example, Formula 2 based on the coordinates of corners of a marker.

$$\text{score}=\max(|\text{angle1}-90|, |\text{angle2}-90|, |\text{angle3}-90|, |\text{angle4}-90|)/90 \quad \text{(Formula 4)}$$

$$\text{angleX}=\text{angle of rectangle corner} \quad \text{(Formula 5)}$$

(1-2-3) Third Example of Process Involved in Computing Criteria Score: Where Criteria are "Front Normal Vector Condition"

The image processing device according to this embodiment computes a criteria score by, for example, performing computation represented by Formula 6 below. Here, "inner (x, y)" shown in Formula 6 is represented by, for example, Formula 7 below. Also, the absolute value of "normal_vector" shown in Formula 6 is represented by, for example, Formula 8 below, and the absolute value of "camera_vector" shown in Formula 6 is represented by, for example, Formula 9 below.

$$\text{score}=1.0-\text{inner}(\text{normal\_vector}, \text{camera\_vector}) \quad \text{(Formula 6)}$$

$$\text{inner}(x,y)=x1\cdot y1+x2\cdot y2+x3\cdot y3 \quad \text{(Formula 7)}$$

$$|\text{normal\_vector}|=1 \quad \text{(Formula 8)}$$

$$|\text{camera\_vector}|=1 \quad \text{(Formula 9)}$$

(1-3) Process Involved in Setting Filter Intensity According to this Embodiment

Next, an example process involved in setting a filter intensity that is set based the criteria score according to this embodiment will be described.

The image processing device according to this embodiment sets, for example, a filter intensity corresponding to the criteria score computed by the above process shown in (1-2). Specifically, the image processing device according to this embodiment sets a filter intensity based on, for example, criteria corresponding to a marker shape indicated by the specified coordinates of corners corresponding to a marker.

More specifically, the image processing device according to this embodiment sets a filter intensity corresponding to the computed criteria score by, for example, setting a filter coefficient w (a value determining the filter intensity; the same applies to the description that follows) corresponding to the computed criteria score. The image processing device according to this embodiment sets a filter intensity corresponding to the computed criteria score by using, for example, filter intensity setting information in which the criteria score is associated with the filter coefficient w.

FIG. 5 is an explanatory diagram showing an example relationship between the criteria score and the filter coefficient w (a value determining a filter intensity) that is indicated by the filter intensity setting information according to this embodiment. In FIG. 5, the criteria score according to this embodiment is shown as a "criteria score."

For example, as shown in FIG. 5, as the criteria score according to this embodiment becomes closer to zero, the imaging device faces more exactly a marker. As the value increases, a marker is more slanted with respect to the imaging device.

In other words, for example, the criteria score according to this embodiment becomes closer to zero as the degree of how exactly an imaging device that produces a captured image faces a marker increases, i.e., as the imaging device faces more exactly the marker.

Also, for example, as indicated by "R" in FIG. 5, the criteria score and the filter coefficient w have a relationship represented by a curve in which a change in the filter coefficient w increases as the criteria score becomes closer to zero.

Note that the relationship between the criteria score and the filter coefficient w is not limited to that shown in FIG. 5. For example, the upper limit value of the filter coefficient w is not limited to "1" that is shown in FIG. 5, and also, the value of the filter coefficient w corresponding to the criteria score may be adjustable, depending on a virtual object corresponding to a marker or the like.

The image processing device according to this embodiment specifies the filter coefficient w corresponding to the computed criteria score by using, for example, filter intensity setting information, such as that shown in FIG. 5, stored in a recording medium, such as a storage unit (described below) or the like. Thereafter, the image processing device according to this embodiment sets the specified filter coefficient w as the filter intensity of a filter used in an image process described below.

Here, as the filter intensity setting information according to this embodiment, illustrated is filter intensity setting information that is common to any markers, any virtual objects, or the like in the setting process. The filter intensity setting information according to this embodiment is not limited to that described above.

For example, the filter intensity setting information according to this embodiment may be set for each marker or for each virtual object. When the filter intensity setting information according to this embodiment is set for each marker or for each virtual object, the image processing device according to this embodiment sets a filter intensity corresponding to the computed criteria score by using, for example, filter intensity setting information set for a marker or filter intensity setting information set for a virtual object corresponding to a marker.

Also, a plurality of pieces of filter intensity setting information may be set. When a plurality of pieces of the filter intensity setting information according to this embodiment are set, the image processing device according to this embodiment selects, for example, filter intensity setting information corresponding to a relative relationship between a marker and a virtual object corresponding to the marker from the plurality of pieces of filter intensity setting information thus set. More specifically, the image processing device according to this embodiment selects filter intensity setting information based on, for example, a size of a marker contained in a captured image and a size of a virtual object corresponding to the marker. Thereafter, the image processing device according to this embodiment uses the selected filter intensity setting information to set a filter intensity corresponding to the computed criteria score.

Figure 6:
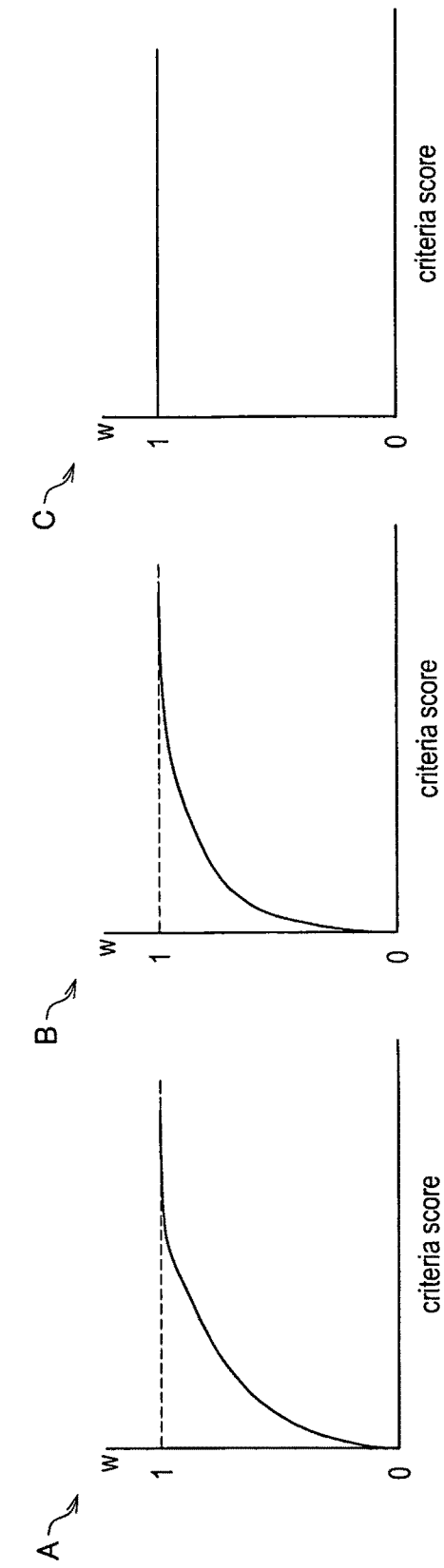
FIG. 6 is an explanatory diagram showing another example relationship between a criteria score and a filter coefficient (a value determining a filter intensity) that is indicated by filter intensity setting information according to this embodiment.

FIG. 6 is an explanatory diagram showing another example relationship between the criteria score and the filter coefficient w (a value determining a filter intensity) that is indicated by the filter intensity setting information according to this embodiment. In FIG. 6, the criteria score according to this embodiment is shown as a "criteria score." "A" shown in FIG. 6 shows an example relationship between the criteria score and the filter coefficient w that is indicated by filter intensity setting information for increasing the effect of a filter in an image process described below. Also, "C" shown in FIG. 6 shows an example relationship between the criteria score and the filter coefficient w that is indicated by filter intensity setting information for eliminating the effect of a filter in an image process described below. Also, "B" shown in FIG. 6 shows an example relationship between the criteria score and the filter coefficient w that is indicated by filter intensity setting information for decreasing the effect of a filter in an image process described below compared to the filter intensity setting information that determines the relationship between the criteria score and the filter coefficient w, that is shown in "A" of FIG. 6.

For example, when the filter intensity setting information according to this embodiment is set for each marker or for each virtual object, the image processing device according to this embodiment selects filter intensity setting information set for a marker or filter intensity setting information set for a virtual object corresponding to a marker from a plurality of pieces of filter intensity setting information, such as those shown in "A" of FIG. 6 to "C" of FIG. 6. Also, the image processing device according to this embodiment uses the selected filter intensity setting information (i.e., filter intensity setting information corresponding to a marker or filter intensity setting information corresponding to a virtual object) to specify a filter coefficient w corresponding to the computed criteria score. Thereafter, the image processing device according to this embodiment sets the filter intensity of a filter used in an image process described below to the specified filter coefficient w.

Also, for example, when a plurality of pieces of the filter intensity setting information according to this embodiment are set, the image processing device according to this embodiment selects filter intensity setting information corresponding to a relative relationship between a marker and a virtual object corresponding to the marker from a plurality of pieces of filter intensity setting information, such as those shown in "A" of FIG. 6 to "C" of FIG. 6.

In an example case where filter intensity setting information is selected from the plurality of pieces of filter intensity setting information shown in "A" of FIG. 6 to "C" of FIG. 6, the image processing device according to this embodiment selects the filter intensity setting information shown in "C" of FIG. 6 when, for example, a size of a virtual object corresponding to a marker contained in a captured image is smaller than a size of the marker. Also, when the virtual object size is greater than the marker size, the image processing device according to this embodiment selects the filter intensity setting information shown in "A" of FIG. 6 or the filter intensity setting information shown in "B" of FIG. 6, based on, for example, the result of comparison of the value of a ratio of the virtual object size to the marker size with a set threshold. For example, if the value of the ratio of the virtual object size to the marker size is greater than the set threshold (or the ratio value is greater than or equal to the threshold), the image processing device according to this embodiment selects the filter intensity setting information shown in "A" of FIG. 6. Also, for example, if the value of the ratio of the virtual object size to the marker size is smaller than or equal to the set threshold (or the ratio value is smaller than the threshold), the image processing device according to this embodiment selects the filter intensity setting information shown in "B" of FIG. 6.

Also, when filter intensity setting information corresponding to a relative relationship between a marker and a virtual object corresponding to the marker is selected from a plurality of pieces of filter intensity setting information, the image processing device according to this embodiment uses the selected filter intensity setting information to specify a filter coefficient w corresponding to the computed criteria score. Thereafter, the image processing device according to this embodiment sets the filter intensity of a filter used in an image process described below to the specified filter coefficient w.

That "the filter intensity setting information according to this embodiment is set for each marker or for each virtual object" or that "a plurality of pieces of the filter intensity setting information according to this embodiment are set" allows the image processing device according to this embodiment to specify a filter coefficient w corresponding to the computed criteria score by using, for example, filter intensity setting information corresponding to a marker, a virtual object, or a relative relationship between a marker and a virtual object. Also, for example, when filter intensity setting information for eliminating the effect of a filter in an image process described below, such as that shown in "C" of FIG. 6, is used, the image processing device according to this embodiment can reduce the process load of an image process described below, and can also improve followability involved in displaying a virtual object.

The image processing device according to this embodiment sets, for example, a filter coefficient w corresponding to the computed criteria score as described above to set a filter intensity corresponding to the computed criteria score.

Note that the filter intensity set by the image processing device according to this embodiment is not limited to the filter coefficient w (a value determining the filter intensity).

For example, the image processing device according to this embodiment can use the computed criteria score directly as a filter intensity. An example process in which the computed criteria score is used directly as a filter intensity will be described in an image process according to this embodiment described below.

(2) Image Process

The image processing device according to this embodiment combines a virtual object corresponding to a marker with a captured image by using, for example, a filter whose filter intensity is set in the above process (setting process) of (1).

The image processing device according to this embodiment corrects the location of a marker by using, for example, a filter that corrects the location of a marker detected in a captured image. Thereafter, the image processing device according to this embodiment combines a virtual object at a location corresponding to the marker whose location has been corrected, by using, for example, a process involved in any technique that can combine an image.

Here, the image processing device according to this embodiment corrects the location of a marker by, for example, performing a computation shown in Formula 10 below by using the filter coefficient w (set filter intensity) set in the above process (setting process) of (1). Here, "x—out (t)" shown in Formula 10 below represents the coordinates of corners of a marker that have been corrected by using, for example, the filter according to this embodiment.

[Math 1]

$$x\_out(t)=(1-w)+w \cdot x(t)(0(\text{strong}) \leq w \leq 1(\text{weak}), x(t)=\text{corner location})$$ (Formula 10)

Figure 7:
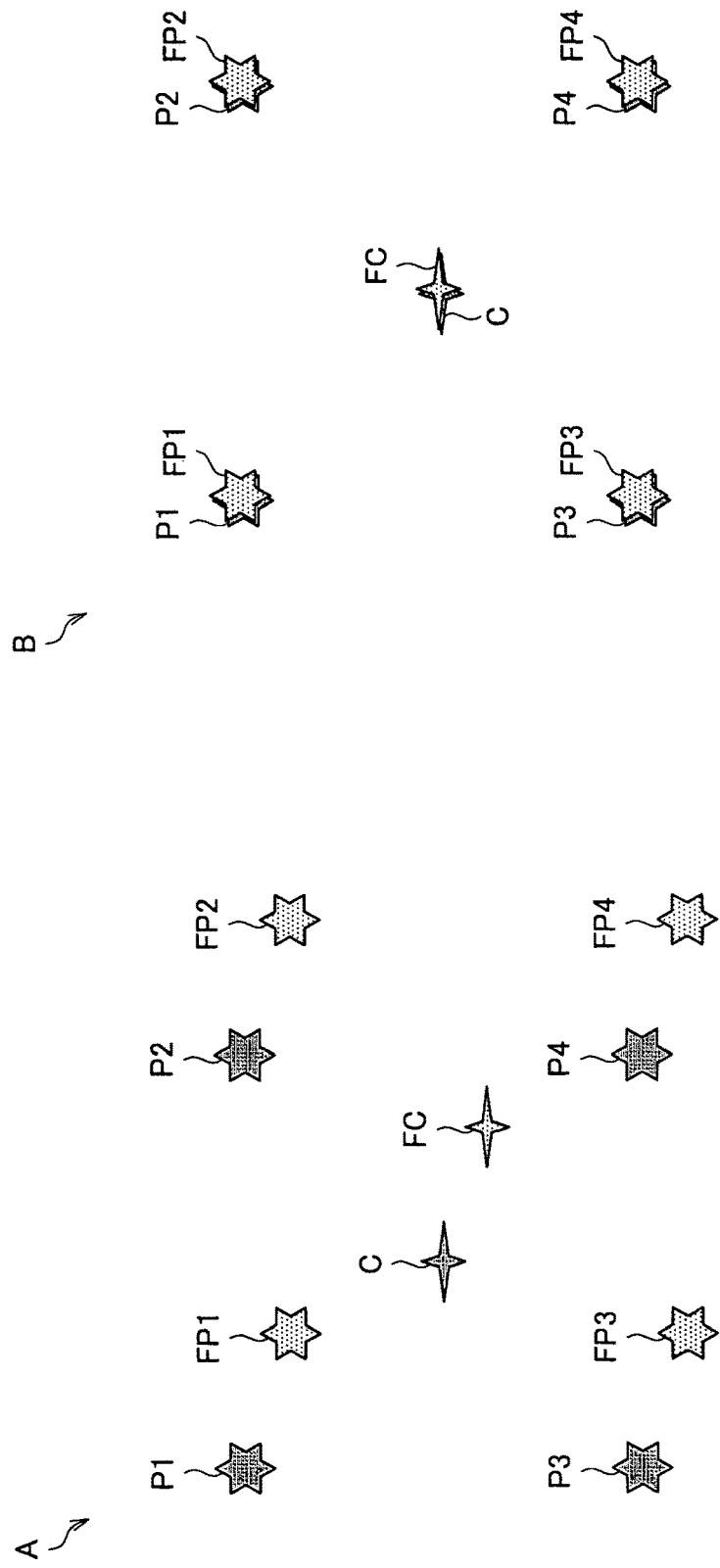
FIG. 7 is an explanatory diagram for describing example correction of a location of a marker by an image process according to this embodiment.

FIG. 7 is an explanatory diagram for describing example correction of the location of a marker by the image process according to this embodiment. "P1," "P2," "P3," and "P4" shown in FIG. 7 indicate an example of the coordinates of corners corresponding to a marker, and "C" shown in FIG. 7 indicates an example of the coordinates of a center location of a marker. Also, "FP1," "FP2," "FP3," and "FP4" shown in FIG. 7 indicate an example of the coordinates of corners of a marker that are output by a filter, and "FC" shown in FIG. 7 indicates an example of the coordinates of a center location of a marker that are output by a filter. "A" shown in FIG. 7 and "B" shown in FIG. 7 each indicate an example output of a filter, i.e., an example marker whose location has been corrected.

When a filter that corrects the location of a marker is used, the image processing device according to this embodiment corrects the location of a marker that is represented by, for example, two-dimensional coordinates. Thereafter, the image processing device according to this embodiment combines a virtual object at a location corresponding to a marker whose location has been corrected, in a captured image.

Figure 8:
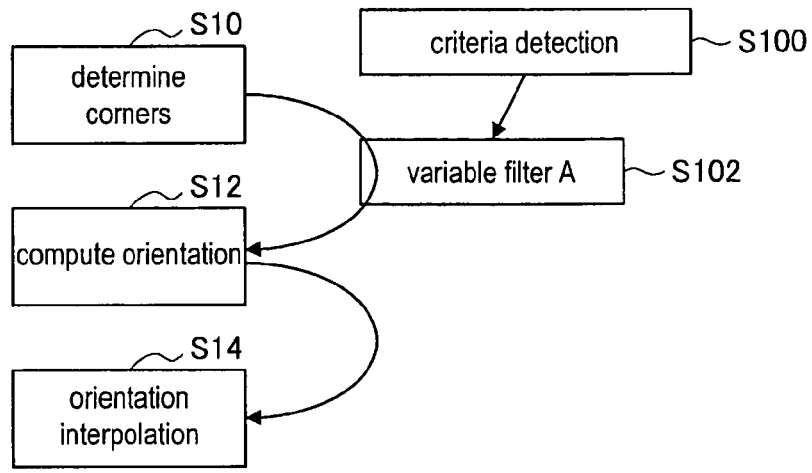
FIG. 8 is an explanatory diagram showing an example process involved in an image processing method according to this embodiment.

FIG. 8 is an explanatory diagram showing an example process involved in the image processing method according to this embodiment, indicating an example process in a case where two-dimensional coordinates of a marker detected in a captured image are corrected. Here, for example, processes in steps S10 and S100 shown in FIG. 8 correspond to the above process (setting process) of (1), and processes in steps S102, S12, and S14 shown in FIG. 8 correspond to the image process according to this embodiment. Also, processes in steps S10, S12, and S14 shown in FIG. 8 indicate processes similar to the basic process involved in combining a virtual object that has been described with reference to FIG. 1.

To correct the location of a marker that is represented by two-dimensional coordinates, the image processing device according to this embodiment corrects, for example, the locations of corners of a marker that have been detected in a captured image in step S10, by using the filter according to this embodiment. Thereafter, for example, the image processing device according to this embodiment performs the 3D computation of step S12 on the corrected location of the marker represented by two-dimensional coordinates to obtain three-dimensional coordinates (three-dimensional data) representing a relative location relationship between the imaging device and the marker. Thereafter, in step S14, the image processing device according to this embodiment combines a virtual object corresponding to the marker with the captured image based on the three-dimensional coordinates representing the relative location.

Note that the process involved in the image processing method according to this embodiment in a case where a filter that corrects the location of a marker is used is not limited to a process of correcting the location of a marker that is represented by two-dimensional coordinates.

For example, when a filter that corrects the location of a marker is used, the image processing device according to this embodiment may correct the location of a marker that is represented by three-dimensional coordinates that indicate a relative relationship between the imaging device and the marker.

Figure 9:
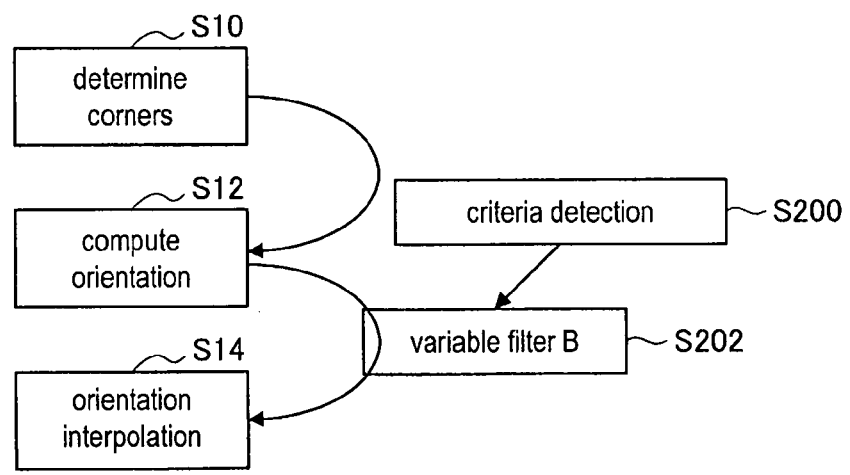
FIG. 9 is an explanatory diagram showing another example process involved in an image processing method according to this embodiment.

FIG. 9 is an explanatory diagram showing another example process involved in the image processing method according to this embodiment, indicating an example process in a case where the location of a marker represented by three-dimensional coordinates that indicates a relative relationship between the imaging device and the marker is corrected. Here, for example, processes in steps S10 and S200 shown in FIG. 9 correspond to the above process (setting process) of (1), and processes in steps S202, S12, and S14 shown in FIG. 9 correspond to the image process according to this embodiment. Also, processes in steps S10, S12, and S14 shown in FIG. 9 correspond to processes similar to the basic process involved in combining a virtual object that has been described with reference to FIG. 1.

To correct the location of a marker represented by three-dimensional coordinates, the image processing device according to this embodiment corrects, for example, a location represented by three-dimensional coordinates that indicates a relative location relationship between the imaging device and the marker that has been detected in step S12, by using the filter according to this embodiment. Thereafter, for example, in step S14, the image processing device according to this embodiment combines a virtual object corresponding to the marker with the captured image based on the corrected three-dimensional coordinates.

For example, as described above, the image processing device according to this embodiment corrects the location of a marker by using a filter that corrects the location of a marker detected in a captured image, and combines a virtual object at a location corresponding to the marker whose location has been corrected.

Here, the filter according to this embodiment is a filter whose filter intensity is set based on how exactly an imaging device that produces a captured image faces a marker. Therefore, the image processing device according to this embodiment can combine a virtual object with a captured image based on how exactly an imaging device faces a marker.

Therefore, the image processing device according to this embodiment can prevent the disturbance of display of a virtual object that may occur when an image obtained by combining the virtual object with a captured image is displayed on a display screen, such as, for example, that a displayed virtual object is blurred, and the like.

Note that the image process according to this embodiment is not limited to the above process that uses a filter that corrects the location of a marker detected in a captured image.

For example, the image processing device according to this embodiment may combine a virtual object corresponding to a marker with a captured image by using a visual filter involved in displaying a virtual object in the image process according to this embodiment.

Here, the visual filter according to this embodiment may be, for example, a "filter that allows a virtual object to follow the location of a marker based on how exactly an imaging device faces the marker," or a "filter that selects a virtual object based on how exactly an imaging device faces a marker."

(2-1) First Example Image Process Using Visual Filter

When the visual filter according to this embodiment is a "filter that allows a virtual object to follow the location of a marker based on how exactly an imaging device faces the marker," the image processing device according to this embodiment sets the filter intensity to, for example, the computed criteria score in the above process of (1). Note that, in the above case, the image processing device according to this embodiment may set the filter intensity to, for example, the filter coefficient w.

Also, when the visual filter according to this embodiment is a "filter that allows a virtual object to follow the location of a marker based on how exactly an imaging device faces a marker," the image processing device according to this embodiment assumes, for example, the computed criteria score (filter intensity) as the stability of recognition of a marker in a captured image, in the image process. Thereafter, in the image process, for example, the image processing device according to this embodiment changes the display of a virtual object related to a marker based on the stability in a manner similar to the technique described in JP 2012-221250A, filed by the present applicant.

Therefore, when an image obtained by combining a virtual object with a captured image by performing the first example process using a visual filter is displayed on a display screen, the virtual object displayed follows a marker on the display screen, for example.

Here, when the first example process using a visual filter is performed, the image processing device according to this embodiment combines a virtual object with a captured image based on the stability that is based on how exactly an imaging device faces a marker.

Therefore, even when the first example process using a visual filter is performed, the image processing device according to this embodiment can combine a virtual object with a captured image based on how exactly an imaging device faces a marker.

Also, even when the first example process using a visual filter is performed, the image processing device according to this embodiment can prevent the disturbance of display of a virtual object that may occur when an image obtained by combining the virtual object with a captured image is displayed on a display screen, such as, for example, that a displayed virtual object is blurred, and the like.

(2-2) Second Example Image Process Using Visual Filter

When the visual filter according to this embodiment is a "filter that selects a virtual object based on how exactly an imaging device faces a marker," the image processing device according to this embodiment sets the filter intensity to, for example, the computed criteria score in the above process of (1). Note that, in the above case, the image processing device according to this embodiment may set the filter intensity to, for example, the filter coefficient w.

Also, when the visual filter according to this embodiment is a "filter that selects a virtual object based on how exactly an imaging device faces a marker," the image processing device according to this embodiment selects a virtual object corresponding to the computed criteria score (filter intensity) from a plurality of virtual objects corresponding to markers stored in a recording medium, such as a storage unit (described below), in the image process. For example, the image processing device according to this embodiment selects a virtual object corresponding to the computed criteria score by referencing, for example, a table in which criteria scores are associated with virtual objects and thereby specifying the virtual object corresponding to the criteria score.

Here, the plurality of virtual objects corresponding to markers are, for example, the following virtual objects.

A plurality of virtual objects that are displayed at different locations with respect to a marker, such as, for example, virtual objects having different locations in a depth direction where a surface of a marker is a reference surface, and the like.

A plurality of virtual objects having different types of information that is displayed, such as, for example, a virtual object displaying information that directly represents a content displayed on a marker and a virtual object displaying other information related to a content, and the like.

A plurality of virtual objects having different amounts of information that is displayed.

After a virtual object corresponding to a criteria score is selected, the image processing device according to this embodiment combines the selected virtual object at a location corresponding to a marker in a captured image.

Here, when the second example process using a visual filter is performed, the image processing device according to this embodiment combines a virtual object that is selected based on how exactly an imaging device faces a marker, with a captured image.

Therefore, even when the second example process using a visual filter is performed, the image processing device according to this embodiment can combine a virtual object with a captured image based on how exactly an imaging device faces a marker.

The image processing device according to this embodiment performs, for example, the above process (setting process) of (1) and the above process (image process) of (2) as a process involved in the image processing method according to this embodiment.

Here, in the above process (image process) of (2), the image processing device according to this embodiment combines a virtual object corresponding to a marker with a captured image using a filter whose filter intensity is set based on how exactly an imaging device that produces the captured image in the above process (setting process) of (1) faces a marker. In other words, the image processing device according to this embodiment can combine a virtual object with a captured image based on how exactly an imaging device faces a marker, by performing a process involved in the image processing method according to this embodiment.

Therefore, the image processing device according to this embodiment can prevent the disturbance of display of a virtual object that may occur when an image obtained by combining the virtual object with a captured image is displayed on a display screen, such as, for example, that a displayed virtual object is blurred, and the like.

(Image Processing Device According to this Embodiment)

Next, an example configuration of the image processing device according to this embodiment that can perform the above process involved in the image processing method according to this embodiment, will be described.

Figure 10:
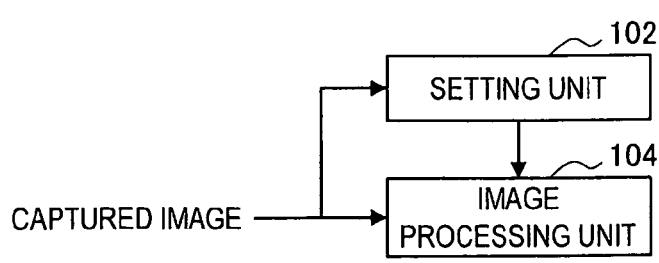
FIG. 10 is a block diagram showing an example configuration of an image processing device according to this embodiment.

FIG. 10 is a block diagram showing an example configuration of an image processing device 100 according to this embodiment. The image processing device 100 includes, for example, a setting unit 102 and an image processing unit 104.

Also, the image processing device 100 may also include, for example, a control unit (not shown), a read only memory (ROM, not shown), a random access memory (RAM, not shown), a storage unit (not shown), a communication unit (not shown), an operation unit (not shown) operable by the user, a display unit (not shown) that displays various screens on a display screen, and the like. In the image processing device 100, the above components are connected together by, for example, a bus as a data transmission channel.

Here, the control unit (not shown), which includes a micro processing unit (MPU), various processing circuits, and the like, controls the entire image processing device 100. The control unit (not shown) may also include the setting unit 102 and the image processing unit 104 to play a main role in a process involved in the image processing method according to this embodiment. Note that the image processing device 100 may include either or both of the setting unit 102 and the image processing unit 104 separately from the control unit (not shown) (e.g., one or both of the setting unit 102 and the image processing unit 104 are implemented as a process circuit separate from the control unit (not shown)).

The ROM (not shown) stores control data used by the control unit (not shown), such as a program, computation parameters, and the like. The RAM (not shown) temporarily stores a program executed by the control unit (not shown), and the like.

The storage unit (not shown), which is a storage means included in the image processing device 100, stores various data involved in the image processing method according to this embodiment, such as, for example, model data indicating a marker, data indicating a virtual object, filter intensity setting information, data indicating a table in which criteria scores are associated with virtual objects, and the like. Also, the storage unit (not shown) may store various data, such as, for example, captured image data indicating a captured image, an application, and the like. Here, examples of the storage unit (not shown) include magnetic recording media, such as a hard disk and the like, nonvolatile memories, such as an electrically erasable and programmable read only memory (EEPROM), flash memory, and the like, and the like. Also, the storage unit (not shown) may be removably attached to the image processing device 100.

The communication unit (not shown) is, for example, a communication interface described below. The operation unit (not shown) is, for example, an operation device described below. Also, the display unit (not shown) is, for example, a display device described below.

[Example Hardware Configuration of Image Processing Device 100]

Figure 11:
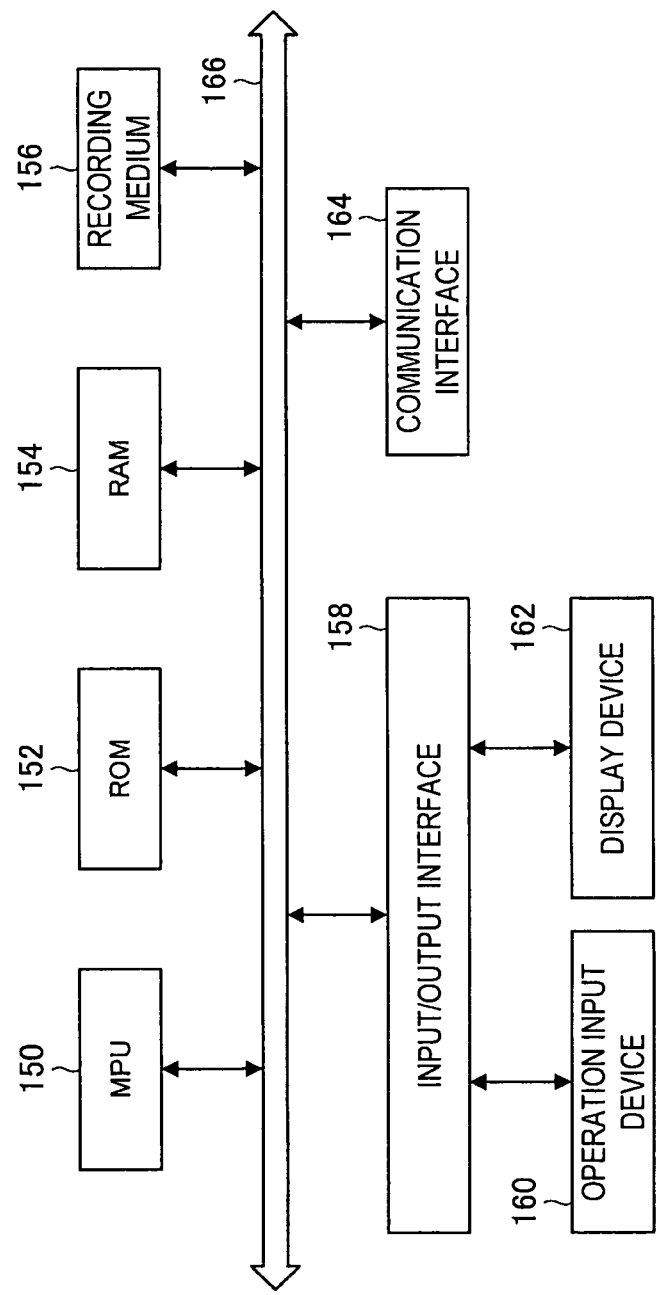
FIG. 11 is an explanatory diagram showing an example hardware configuration of an image processing device according to this embodiment.

FIG. 11 is an explanatory diagram showing an example hardware configuration of the image processing device 100 according to this embodiment. The image processing device 100 includes, for example, an MPU 150, a.ROM 152, a RAM 154, a recording medium 156, an input/output interface 158, an operation input device 160, a display device 162, and a communication interface 164. Also, in the image processing device 100, components are connected together by, for example, a bus 166 as a data transmission channel.

The MPU 150, which includes, for example, an MPU, various processing circuits, and the like, functions as a control unit (not shown) that controls the entire image processing device 100. Also, the MPU 150 functions as, for example, the setting unit 102 and the image processing unit 104 in the image processing device 100.

The ROM 152 stores control data used by the MPU 150, such as a program, computation parameters, and the like. The RAM 154 temporarily stores, for example, a program executed by the MPU 150 and the like.

The recording medium 156 functions as a storage unit (not shown) to store various data involved in the image processing method according to this embodiment, such as, for example, model data, data indicating a virtual object, and the like, and various data, such as an application and the like. Here, examples of the recording medium 156 include magnetic recording media, such as a hard disk and the like, and nonvolatile memories, such as a flash memory and the like. Also, the recording medium 156 may be removably attached to the image processing device 100.

To the input/output interface 158, for example, the operation input device 160 and the display device 162 are connected. The operation input device 160 functions as an operation unit (not shown), and the display device 162 functions as a display unit (not shown). Here, examples of the input/output interface 158 include a universal serial bus (USB) terminal, a digital visual interface (DVI) terminal, a high-definition multimedia interface (HDMI) (registered trademark) terminal, various processing circuits, and the like. Also, the operation input device 160 is, for example, provided on the image processing device 100, and is connected to the input/output interface 158 in the image processing device 100. Examples of the operation input device 160 include a button, a direction key, a rotational selector, such as a jog dial or the like, or a combination thereof, and the like. Also, the display device 162 is, for example, provided on the image processing device 100, and is connected to the input/output interface 158 in the image processing device 100. Examples of the display device 162 include a liquid crystal display, an organic electro-luminescence display (or also called an organic light emitting diode display (OLED display)), and the like.

Note that, needless to say, the input/output interface 158 is connectable to an external device, such as an operation input device (e.g., a keyboard, mouse, or the like) as an external device to the image processing device 100, a display device, and the like. Also, the display device 162 may be a device that allows for displaying and user operation, such as, for example, a touch screen or the like.

The communication interface 164, which is a communication means included in the image processing device 100, functions as an communication unit that performs wireless/wired communication through a network (or directly) with an external device, such as an imaging device that produces a captured image, a display device that can display an image on a display screen, or the like. Here, examples of the communication interface 164 include a communication antenna and an RF circuit (wireless communication), an IEEE802.15.1 port and a transmitter/receiver circuit (wireless communication), an IEEE802.11b port and a transmitter/receiver circuit (wireless communication), or a local area network (LAN) terminal and a transmitter/receiver circuit (wired communication), and the like. Also, examples of the network according to this embodiment include wired networks, such as a LAN, a wide area network (WAN), and the like, wireless networks, such as a wireless LAN (wireless local area network (WLAN)) or a wireless wide area network (WWAN) through a base station, and the like, or the Internet employing a communication protocol, such as the transmission control protocol/internet protocol (TCP/IP)) or the like, and the like.

The image processing device 100 has, for example, a configuration shown in FIG. 11 that allows for a process involved in the image processing method according to this embodiment. Note that the hardware configuration of the image processing device 100 according to this embodiment is not limited to the configuration shown in FIG. 11.

For example, the image processing device 100 may include an imaging device that serves as an imaging unit (not shown) that produces a captured image according to this embodiment. When the image processing device 100 includes such an imaging device, the image processing device 100 can, for example, process a captured image that is produced by imaging in the imaging device.

Here, the imaging device according to this embodiment is, for example, a lens/imaging element and a signal processing circuit. The lens/imaging element includes, for example, a lens of an optical system, and an image senor including a plurality of imaging elements, such as a complementary metal oxide semiconductor (CMOS) or the like. Also, the signal processing circuit, which includes, for example, an automatic gain control (AGC) circuit or analog to digital converter (ADC), converts an analog signal produced by an imaging element into a digital signal (image data), and performs various signal processes. Examples of the signal processes performed by the signal processing circuit include a white balance correction process, color tone correction process, gamma correction process, YCbCr conversion process, edge enhancement process, and the like.

Also, the image processing device 100 may include, for example, a plurality of communication interfaces having different communication schemes or the same communication scheme.

Also, for example, when the image processing device 100 communicates with an external device, such as the display device according to this embodiment or the like, through an external communication device connected thereto through the input/output interface 158 or the like, the image processing device 100 may not include the communication interface 164.

Also, when the image processing device 100 has, for example, a configuration that performs a process in a stand-alone fashion (e.g., the image processing device 100 includes an imaging device, and processes a captured image produced by the imaging device, or the like), the image processing device 100 may not include the communication device 164.

Also, the image processing device 100 may have a configuration that does not include the operation device 160 or the display device 162.

Referring back to FIG. 10, an example configuration of the image processing device 100 will be described. The setting unit 102 plays a main role in performing the above process (setting process) of (1), and sets a filter intensity based on how exactly an imaging device that produces a captured image faces a marker, which is detected based on the captured image.

More specifically, for example, the setting unit 102 specifies the coordinates of corners corresponding to a marker in a captured image, and sets a filter intensity based on criteria corresponding to a shape of the marker indicated by the specified corner coordinates.

Here, the captured image processed by the setting unit 102 is, for example, a captured image that is produced by an imaging device, such as an imaging device included in an imaging unit (not shown), an imaging device included in an external imaging device, or the like. Also, the captured image processed by the setting unit 102 may be, for example, an image that is indicated by image data stored in a recording medium, such as a storage unit (not shown), an external recording medium connected to the image processing device 100, a recording medium included in an external device that can communicate with the image processing device 100, or the like.

The image processing unit 104 plays a main role in the above process (image process) of (2), and combines a virtual object corresponding to a marker with a captured image by using a filter whose filter intensity is set in the setting unit 102.

More specifically, when the image processing unit 104 uses a filter that corrects the location of the marker according to this embodiment, the image processing unit 104 corrects, for example, as shown in FIG. 8 or FIG. 9, the location of a marker represented by two-dimensional coordinates, or the location of a marker represented by three-dimensional coordinates indicating a relative relationship between the imaging device and the marker. Thereafter, the image processing unit 104 combines a virtual object corresponding to a marker at a location corresponding to the marker whose location has been corrected.

Also, the image processing unit 104 may display an image obtained by combining a captured image with a virtual object on a display screen, or store such an image in a recording medium.

Here, an object on which the image processing unit 104 displays an image obtained by combining a captured image with a virtual object is, for example, a display screen of a display unit (not shown), or a display screen of an external imaging device. The image processing unit 104 displays an image obtained by combining a captured image with a virtual object on a display screen by, for example, transferring a signal indicating such an image obtained by combining a captured image with a virtual object, and a control signal for controlling display, to a display unit (not shown) or the like. Also, a recording medium in which the image processing unit 104 stores an image obtained by combining a captured image with a virtual object is, for example, a storage unit (not shown), an external recording medium connected to the image processing device 100, a recording medium included in an external device that can communicate with the image processing device 100, or the like.

Also, for example, as shown in the above (2-1) or the above (2-2), the image processing unit 104 may combine a virtual object with a captured image by using the visual filter according to this embodiment, such as a "filter that causes a virtual object to follow the location of a marker based on how exactly an imaging device faces a marker," or a "filter that selects a virtual object based on how exactly an imaging device faces a marker," or the like.

The image processing device 100 has, for example, a configuration shown in FIG. 11, to perform a process involved in the image processing method according to this embodiment (e.g., the above process (setting process) of (1) and the above process (image process) of (2)).

Therefore, the image processing device 100, which has, for example, the configuration shown in FIG. 11, can prevent the disturbance of display of a virtual object that may occur when an image obtained by combining the virtual object with a captured image is displayed on a display screen, such as, for example, that a displayed virtual object is blurred, and the like.

Note that the configuration of the image processing device according to this embodiment is not limited to the configuration shown in FIG. 11.

For example, the image processing device according to this embodiment may further include an imaging unit (not shown) having an imaging device. When the image processing device according to this embodiment includes an imaging unit (not shown), the image processing device according to this embodiment can process a captured image that is produced by an imaging unit (not shown).

Also, the image processing device according to this embodiment may be configured to further include, for example, a storage unit (not shown), communication unit (not shown), display unit (not shown), or the like.

Although an image processing device has been described above as an example of this embodiment, this embodiment is not limited to such an embodiment. This embodiment is applicable to various apparatuses, such as, for example, communication apparatuses, such as a mobile telephone, smartphone, and the like, tablet apparatuses, apparatuses with an imaging function, such as a digital video camera and the like, video/music playback apparatuses (or video/music recording/playback apparatuses), game apparatuses, computers, such as a personal computer (PC), server, and the like, display apparatuses, such as a television set, monitor, and the like, and the like. This embodiment is also applicable to, for example, a process integrated circuit (IC) that can be incorporated in the above apparatuses.

Also, a process involved in the image processing method according to this embodiment may be implemented by a system including a plurality of devices that are assumed to be connected to a network (or communication between each device), as in, for example, cloud computing.

(Program According to this Embodiment)

A program that causes a computer to function as the image processing device according to this embodiment (e.g., a program that can execute a process involved in the image processing method according to this embodiment, such as the above process (setting process) of (1) and the above process (image process) of (2), or the like) may be executed by a computer to prevent the disturbance of display of a virtual object.

The preferred embodiment(s) of the present disclosure has/have been described above with criteria to the accompanying drawings, whilst the present disclosure is not limited to the above examples, of course. A person skilled in the art may find various alterations and modifications within the scope of the appended claims, and it should be understood that they will naturally come under the technical scope of the present disclosure.

For example, in the foregoing, provided is a program (computer program) for causing a computer to function as the image processing device according to this embodiment. In addition, this embodiment may additionally provide a recording medium storing the program.

The above configurations are only for purposes of illustrating this embodiment, and of course, fall within the scope of the present disclosure.

Additionally, the present technology may also be configured as below.

(1)

An image processing device including:

a setting unit configured to set a filter intensity based on a degree of how exactly an imaging device that produces a captured image containing a marker related to display of a virtual object faces the marker, the degree being detected based on the captured image; and an image processing unit configured to combine the virtual object corresponding to the marker with the captured image by using a filter having the set filter intensity.

(2)

The image processing device according to (1), wherein the image processing unit corrects a location of the marker by using the filter, and combines the virtual object at a location corresponding to the marker having the corrected location.

(3)

The image processing device according to (2), wherein the setting unit specifies coordinates of corners corresponding to the marker, and sets the filter intensity based on criteria corresponding to a shape of the marker indicated by the specified coordinates of corners.

(4)

The image processing device according to (3), wherein the setting unit computes a criteria score indicating the degree based on the specified coordinates of corners and the criteria, and sets the filter intensity corresponding to the computed criteria score.

(5)

The image processing device according to (4), wherein the criteria score becomes closer to zero as the degree increases.

(6)

The image processing device according to (4) or (5), wherein the setting unit sets the filter intensity corresponding to the computed criteria score by using filter intensity setting information containing the criteria score and a value determining the filter intensity associated with each other.

(7)

The image processing device according to (6), wherein the filter intensity setting information is set for each marker or for each virtual object, and wherein the setting unit uses filter intensity setting information set for the marker or filter intensity setting information set for the virtual object corresponding to the marker.

(8)

The image processing device according to (6), wherein a plurality of pieces of the filter intensity setting information are set, and wherein the setting unit selects filter intensity setting information corresponding to a relative relationship between the marker and the virtual object corresponding to the marker from the plurality of pieces of set filter intensity setting information, and uses the selected filter intensity setting information.

(9)

The image processing device according to any one of (3) to (8), wherein the setting unit sets a rectangular region containing the marker, and specifies coordinates of four corners of the set region as the coordinates of corners corresponding to the marker.

(10)

The image processing device according to (2) to (9), wherein the image processing unit corrects the location of the marker represented by two-dimensional coordinates.

(11)

The image processing device according to any one of (2) to (9),
wherein the image processing unit corrects the location of the marker represented by three-dimensional coordinates, the location indicating a relative relationship between the imaging device and the marker.

(12)

An image processing method including:
a step of setting a filter intensity based on a degree of how exactly an imaging device that produces a captured image containing a marker related to display of a virtual object faces the marker, the degree being detected based on the captured image; and
a step of combining the virtual object corresponding to the marker with the captured image by using a filter having the set filter intensity.

(13)

A program for causing a computer to execute:
a step of setting a filter intensity based on a degree of how exactly an imaging device that produces a captured image containing a marker related to display of a virtual object faces the marker, the degree being detected based on the captured image; and
a step of combining the virtual object corresponding to the marker with the captured image by using a filter having the set filter intensity.

CRITERIA SIGNS LIST 100 image processing device
102 setting unit
104 image processing unit

The invention claimed is:

1. An image processing device, comprising:
circuitry configured to:
determine first coordinates of corners corresponding to a marker in a captured image;
determine a criteria score, based on the first coordinates of the corners and a criteria corresponding to a shape of the marker,
wherein the criteria score indicates a degree corresponding to a relative location relationship between an imaging device and the marker;
set a filter intensity corresponding to the determined criteria score;
correct a location of the marker based on a filter having the set filter intensity; and
combine a virtual object corresponding to the marker with the captured image at the corrected location based on the filter having the set filter intensity.

2. The image processing device according to claim 1, wherein the criteria score approaches zero based on an increase in the degree.

3. The image processing device according to claim 1, wherein the circuitry is further configured to set the filter intensity corresponding to the determined criteria score based on filter intensity setting information, and wherein the filter intensity setting information includes the criteria score and a value that determines the filter intensity.

4. The image processing device according to claim 3, wherein the filter intensity setting information is set for one of each marker of a plurality of markers or each virtual object of a plurality of virtual objects corresponding to the plurality of markers and wherein the circuitry is further configured to set the filter intensity based on the filter intensity setting information set for one of the marker or the virtual object corresponding to the marker.

5. The image processing device according to claim 3, wherein a plurality of pieces of the filter intensity setting information are set, and
wherein the circuitry is further configured to:
select the filter intensity setting information corresponding to the relative location relationship between the marker and the virtual object corresponding to the marker from the set plurality of pieces of the filter intensity setting information, and
determine the value that determines the filter intensity, based on the selected filter intensity setting information.

6. The image processing device according to claim 1, wherein the circuitry is further configured to:
set a rectangular region containing the marker, and
determine second coordinates of four corners of the rectangular region as the first coordinates of the corners corresponding to the marker.

7. The image processing device according to claim 1, wherein the circuitry is further configured to correct the location of the marker that is represented by two-dimensional coordinates.

8. The image processing device according to claim 1, wherein the circuitry is further configured to correct the location of the marker represented by three-dimensional coordinates, and
wherein the location indicates the relative location relationship between the imaging device and the marker.

9. An image processing method, comprising:
determining coordinates of corners corresponding to a marker in a captured image;
determining a criteria score, based on the determined coordinates of the corners and a criteria corresponding to a shape of the marker,
wherein the criteria score indicates a degree corresponding to a relative location relationship between an imaging device and the marker;
setting a filter intensity corresponding to the determined criteria score;
correcting a location of the marker based on a filter having the set filter intensity; and
combining a virtual object corresponding to the marker with the captured image at the corrected location based on the filter having the set filter intensity.

10. A non-transitory computer-readable medium having stored thereon computer readable instructions, which when executed by a computer, cause the computer to execute operations, the operations comprising:
determining coordinates of corners corresponding to a marker in a captured image;
determining a criteria score, based on the coordinates of the corners and a criteria corresponding to a shape of the marker,
wherein the criteria score indicates a degree corresponding to a relative location relationship between an imaging device and the marker;
setting a filter intensity corresponding to the determined criteria score;
correcting a location of the marker based on a filter having the set filter intensity; and
combining a virtual object corresponding to the marker with the captured image at the corrected location based on the filter having the set filter intensity.

11. An image processing device, comprising:

circuitry configured to:

determine coordinates of corners corresponding to a marker in a captured image;

determine a criteria score based on the coordinates of the corners and a criteria corresponding to a shape of the marker, wherein the criteria score indicates a degree that is a relative location relationship between an imaging device and the marker;

set a filter intensity corresponding to the determined criteria score based on filter intensity setting information, wherein the filter intensity setting information includes the criteria score and a value that determines the filter intensity, and wherein the filter intensity setting information is set for one of the marker or a virtual object corresponding to the marker; and combine the virtual object corresponding to the marker with the captured image based on a filter having the set filter intensity.

12. An image processing device, comprising:

circuitry configured to:

determine coordinates of corners corresponding to a marker in a captured image;

determine a criteria score, based on the coordinates of the corners and a criteria corresponding to a shape of the marker, wherein the criteria score indicates a degree corresponding to a first relative location relationship between an imaging device and the marker;

set a plurality of pieces of filter intensity setting information;

select a piece of filter intensity setting information from the plurality of pieces of filter intensity setting information, wherein the piece of filter intensity setting information corresponds to a second relative location relationship between the marker and a virtual object corresponding to the marker from the set plurality of pieces of filter intensity setting information;

set a filter intensity corresponding to the determined criteria score based on the selected piece of filter intensity setting information; and combine the virtual object corresponding to the marker with the captured image based on a filter having the set filter intensity.

* * * * *